Sept. 29, 1953 A. C. SCHROEDER ET AL 2,653,993

SIMULTANEOUS COLOR TELEVISION OPTICAL SYSTEM

Filed April 29, 1948 2 Sheets-Sheet 1

INVENTORS
ALFRED C. SCHROEDER
& GEORGE C. SZIKLAI
BY [signature]
ATTORNEY

INVENTORS
ALFRED C. SCHROEDER
& GEORGE C. SZIKLAI
BY
ATTORNEY

Patented Sept. 29, 1953 2,653,993

UNITED STATES PATENT OFFICE 2,653,993

SIMULTANEOUS COLOR TELEVISION OPTICAL SYSTEM

Alfred C. Schroeder, Feasterville, Pa., and George C. Sziklai, Princeton, N. J., assignors to Radio Corporation of America, a corporation of Delaware Application April 29, 1948, Serial No. 23,914

15 Claims. (Cl. 178—5.4)

This invention relates to optics, and more particularly to the division of color images into selected color components.

Various proposals have been suggested for dividing a color image into its selected color components or primaries. One such arrangement employs partially silvered mirrors in connection with component color or primary color filters. Another suggestion employs dichroic mirrors.

According to the present invention, component color separation is accomplished electronically. An optical color image is transformed into an electronic image. The electronic image is transferred in toto to intercept an electrode arrangement which transmits electrons traveling above a predetermined velocity and reflects electrons traveling at a velocity lower than the predetermined velocity. The present invention is based for its operation on the Einstein equation of photoelectric phenomena, which states that the initial kinetic energy in a photoelectron is a linear function of the frequency of the liberating radiation.

A primary object of this invention is to provide an improved optical system for dividing a color image into selected component or primary colored images.

Another object of this invention is to provide an improved color television system.

Still another object of this invention is to provide for an improved simultaneous type color television camera.

Other and incidental objects of the invention will be apparent to those skilled in the art from a reading of the following specification and an inspection of the accompanying drawing in which like numerals represent similar elements and in which:

Figure 1 illustrates schematically one form of this invention;

Figure 2 also illustrates schematically another form of this invention;

Figure 1:
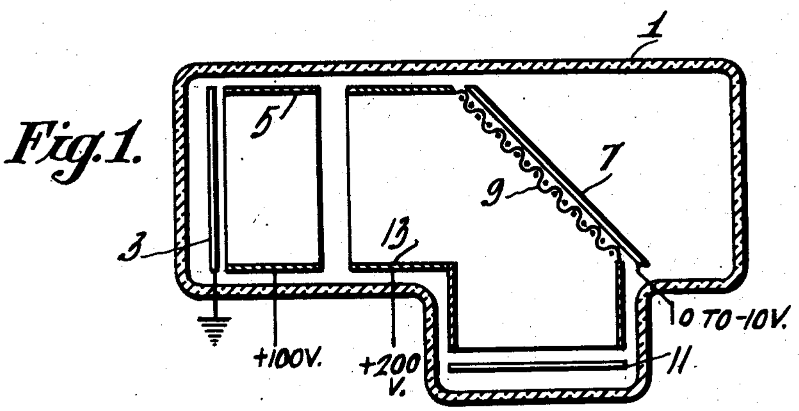

Turning now in more detail to Figure 1, there is illustrated an evacuated envelope 1 which contains a photo cathode 3, upon which there is focused an image. The photo cathode 3 establishes adjacent thereto, by reason of photoelectric emission, an electron image.

An electrostatic lens including ring 5 is positioned to cause the electrons from the electron image adjacent photo cathode 3 to move to the right toward plate 7 which, in connection with the associated screen electrode 9, causes the electrons flowing from photo cathode 3 to be reflected downward to a target electrode 11. Although an electrostatic type lens 5 is shown, an electromagnet lens arrangement may be provided without departing from the spirit of this invention.

The combination of electrodes 7 and 9 operates as an electronic mirror because of the potentials applied thereto. Electrons flowing from the photo cathode 3 will be repelled by the relatively negative potential of electrode 7 and due to its sloping position will be reflected downward. The screen electrode 9 is positioned in front of the electrode 7 in order to prevent a disfiguration of the electrical field within the member 13, and hence prevent image distortion. It will be seen that the potential of the screen 9 is the same as the potential of the member 13.

Figure 2:
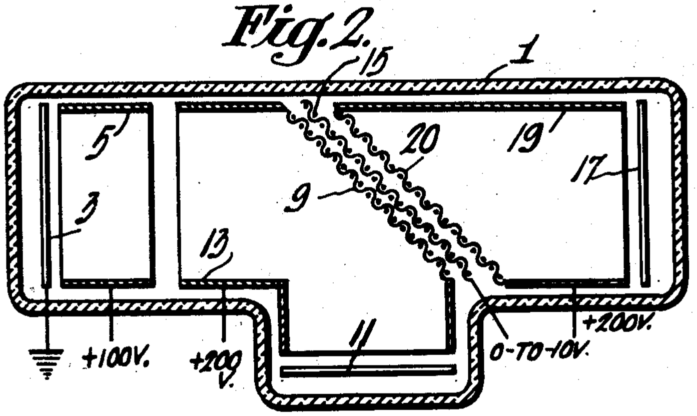

Turning now to Figure 2, there is illustrated still another form of this invention involving in an envelope 1 a photo cathode 3 and its associated electrostatic lens 5.

The form of the invention illustrated in Figure 2 differs from the form of the invention shown in Figure 1 in that the solid plate 7 of Figure 1 is omitted and replaced with a screen electrode 15.

By reason of the difference in velocity of the electron flow coming from cathode 3, not all of the electrons will be reflected downward by screen 15 as in the case of the plate 7 of Figure 1, but some of the electrons will continue through the screen 15 to fall upon the target electrode 17.

Member 19, together with screen 20, is charged at a positive potential such as that applied to member 13. It follows that if the electrons are traveling at a relatively high rate, they will proceed directly through screen 15 to fall upon target electrode 17, while if they are traveling at a slower rate, they will be reflected by screen 15 to fall upon target electrode 11.

The operation of this invention in connection with the division of natural color images into their selected or primary components may perhaps best be understood by a brief reference to electronic theory.

According to the Einstein law of photo emission, electrons leave a photoelectric surface with an initial velocity proportional to the frequency of the impinging radiation.

In Einstein's equation of photoelectric phenomena, the initial kinetic energy of a photo electron is a linear function of the frequency of the liberating radiation according to the relation of $$mv^2/2=hv-\phi$$

where $mv^2/2$ represents the kinetic energy, $h$ is Planck's constant, $v$ is the frequency of the radiation, and $\phi$ is the work function. The kinetic energy is also equal to the product of the electronic charge and the accelerating voltage $$eV = h\nu - \phi$$

where $e$ is the charge and V is the accelerating potential required to impart to an electron the velocity V when the electrons started in vacuum from rest. In the last equation, all the quantities except V and $\nu$ are constant; thus we may see that the potential at which the electron flow starts, or the threshold potential, is a direct function of the frequency of the radiation of a given surface.

This principle has been proposed for electronic spectroscopy. See the article entitled "Electronic Spectroscopy" by applicants, beginning on page 763 of the "Journal of Applied Physics" for October 1946.

According to the Fermi-Dirac distribution of the energy among the conduction electrons, the number of electrons per unit energy is zero above a certain energy level which is lower than the work function of the metal.

Figure 3:
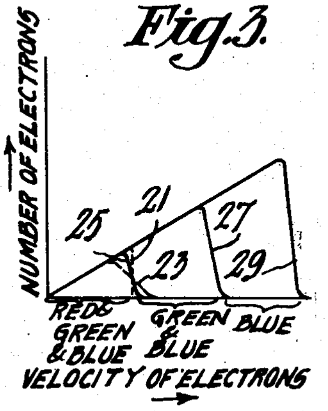
Figure 3 illustrates graphically the operation of certain forms of this invention.

In Figure 3, the dotted line 21 shows the distribution at 0° K. There is also shown by the dashed line 23 the distribution at 1500° K. where the rounding off approaching Maxwellian distribution is caused by thermionic effect. The solid line 25 is illustrated as a compromise which is representative of the energy distribution curve at room temperature and falls between the curves 21 and 23.

It follows that if this information is applied to the current in a photocell which is connected to a variable retarding potential, it is found that if certain wavelength radiation is applied on the surface and the retarding potential is reduced to the threshold potential, current flow begins. When the retarding potential is reduced a greater amount, the current increases almost linearly until saturation occurs.

When light of assorted wavelengths is applied to a photoelectric surface, the total current obtained is a summation of the currents for the individual wavelengths, each of which currents has its threshold at a different potential, as indicated in Figure 3 by the thresholds 25, 27 and 29. It will be seen upon examination of the graph shown in Figure 3 that the portion of the curve up to the threshold 25 includes, for example, the red, green and blue color components. The area between thresholds 25 and 27 contains only the green and blue components, while the area included under the curve between thresholds 27 and 29 contains only the blue component.

The exactness of the indication is limited by the indefiniteness of the threshold values and non-linearity of the currents above the threshold potentials obtainable from available photoelectric surfaces. Lights of three component colors, such as red, green and blue, can be easily differentiated.

Figure 4:
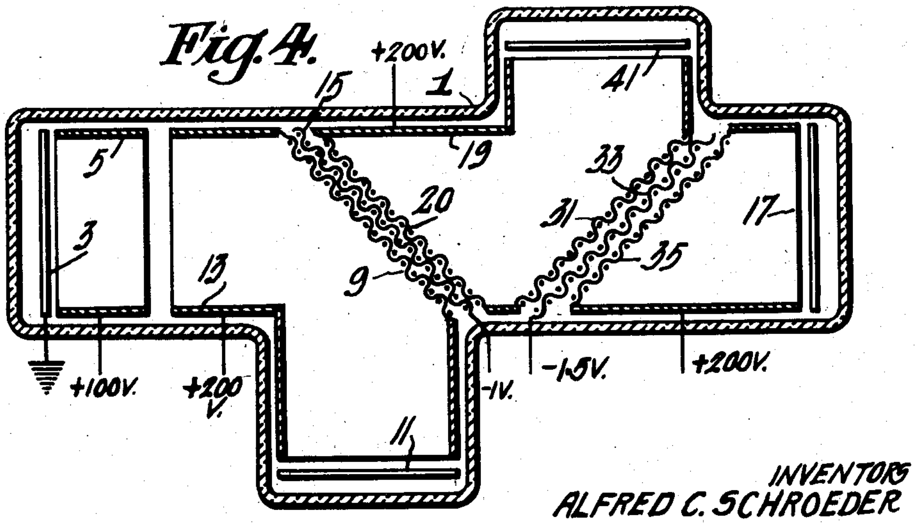
Figure 4 illustrates schematically still another form of this invention.

By employing the invention in the form shown in Figure 4, it is possible to divide out the energy required for the production of the three component colors illustrated and referred to in the graphic illustration of Figure 3.

By inserting a second combination of reflecting screens 31, 33 and 35, together with their associated target electrode 41, and applying the proper potential to the electrodes, a portion of the electron flow between photo cathode 3 and target electrode 17 may be reflected upward to target electrode 41.

If the physical arrangements and applied potentials are properly chosen for all the electrodes and their associated elements, the division between reflection and transmission of the electronic mirrors can be made to correspond to the thresholds indicated in Figure 3.

It will therefore be seen that electrons of the electron flow from photo cathode 3 which are representative of the elemental area light intensity of the color image focused upon photo cathode 3 will be selectively divided so that only the blue representative or the highest velocity electrons will impinge on target electrode 17, while the medium velocity electrons representative of the green and blue light components will pass through the first electronic mirror to be reflected by the second electronic mirror upward toward target electrode 41. Likewise, the electrons having the lower range of velocity will be reflected by the first electronic mirror and will impinge upon target electrode 11.

Figure 5:
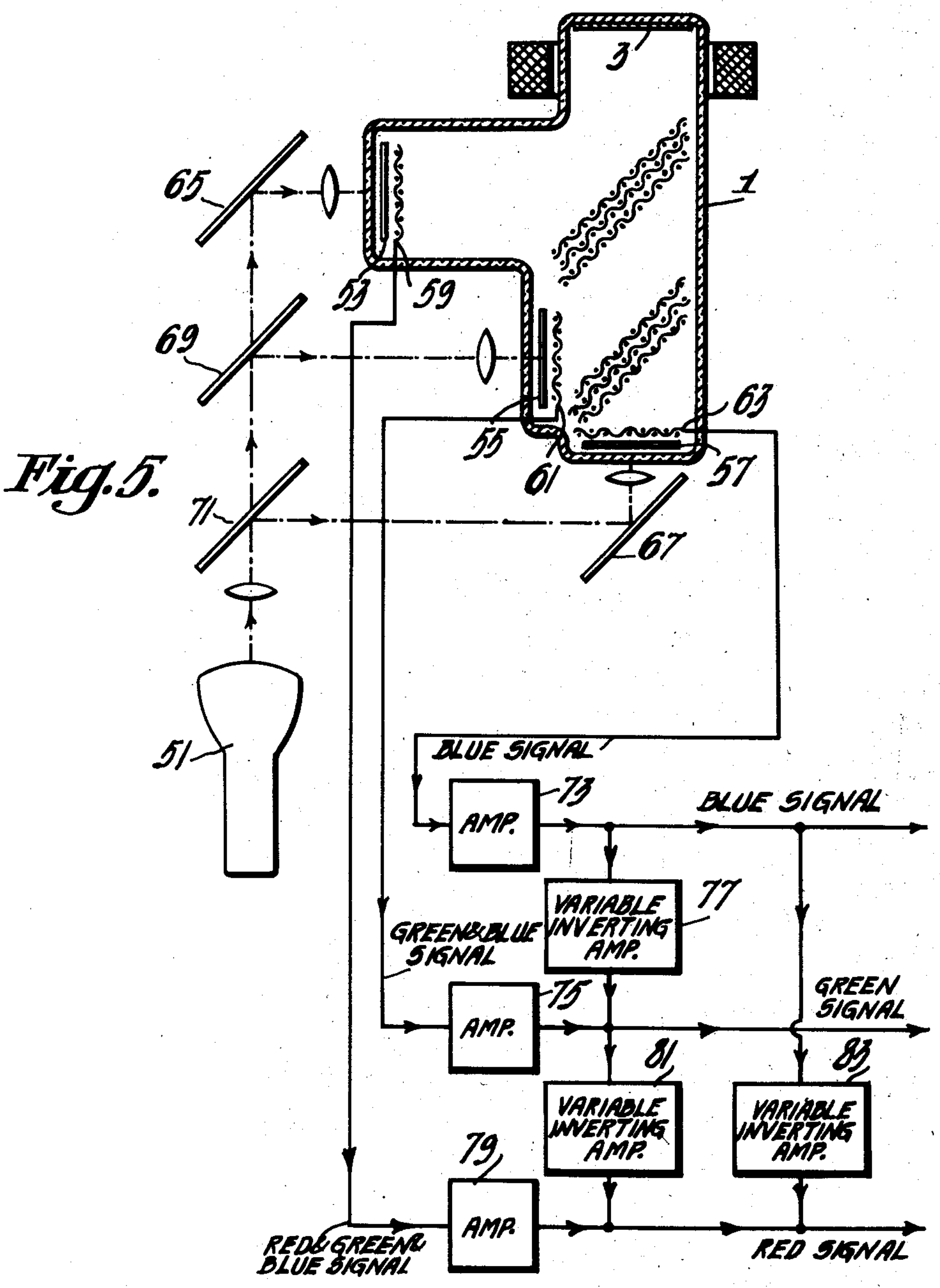
Figure 5 illustrates this invention employed in connection with a simultaneous type color television system.

Although the image expressions which may be obtained from target electrodes 11, 17 and 41 may be useful in certain applications, there is provided in the form of the invention shown in Figure 5 an electrical circuit arrangement which permits the realization of electrical signal trains representative of selected color component images of the color image falling on photo cathode 3.

The operation of the arrangement shown in Figure 5 may best be understood by a brief reference to television camera operation theory.

Image pickup tubes or television cameras may take various forms, such as the so-called orthicon, image orthicon, iconoscope or image iconoscope. The image orthicon is well shown and described in an article entitled "The Image Orthicon, A Sensitive Television Pickup Tube," published in the "Proceedings of the Institute of Radio Engineers" for July 1946. The image iconoscope is described in an article entitled "The Image Iconoscope," published in the "Proceedings of the Institute of Radio Engineers" for September 1939.

The form of the present invention illustrated in Figure 5 differs from the conventional image pickup tubes such as referred to above in an important respect in that the scanning arrangement for producing the video signal consists of a kinescope 51 which provides a blank raster on its screen to be projected on electron targets 53, 55 and 57 in equal intensities and in optical registry with respect to the electron images projected upon the target electrodes 53, 55 and 57 by the optical system described in connection with Figures 1–4 of this drawing.

Upon a review of the operation of the conventional camera tubes referred to above, it will be understood that the target electrodes 53 are so arranged by employment of a mosaic surface that an electron image will be formed thereon to be scanned, and during the scanning operation will provide at terminals 59, 61 and 63 trains of video signals representative of the electron images projected on target electrodes 53, 55 and 57, respectively.

The operation of the auxiliary flying spot for scanning target electrodes is shown and described in the Patent No. 2,552,070 granted May 8, 1951, to George C. Sziklai. Another arrangement of flying spot for the simultaneous generation of component color representative video signals is suggested in the copending U. S. application of Patent No. 2,555,553 granted May 6, 1952, to Paul K. Weimer.

The flying spot is divided and reflected to the target electrodes 53, 55 and 57 by the mirrors 65 and 67, together with the partially silvered mirrors 69 and 71.

The blue image representative signal which is obtained from terminal 63 is applied to amplifier 73, and the blue signal indicated in the output circuit is obtained directly therefrom.

The green and blue image representative signal obtained from control electrode 61 is applied to the amplifier 75. The green image representative signal is obtained from the combination of the green and blue image representative signal applied to amplifier 75 by subtracting through variable inverting amplifier 77 the proper amount of blue signal.

The red, green and blue image representative signal obtained from terminal 59 is applied to amplifier 79. The red representative signal is obtained by subtracting the green and blue image representative signal through variable inverting amplifiers 81 and 83.

It will therefore be seen that a simultaneous type television signal is obtained.

One important feature of this invention is its employment of a single raster in the development of several selected component color image representative signal trains. This permits accurate registration and results in an improved simultaneous type color television signal.

Having thus described the invention, what is claimed is:

1. An apparatus for dividing optical images into selected component color images comprising means for producing electron images of said optical images, a plurality of electron image targets, electron image focus means for simultaneously transferring all parts of said electron images by electron flow from said electron producing means to at least one of said targets in image focus, the threshold velocity of the electrons in said flow dependent upon the corresponding electron image area color representative characteristics, and means for selectively reflecting the electrons of said electron flow in accordance with their velocity.

2. Apparatus for dividing optical images into selected component color images comprising means for producing electron images of said optical images, a plurality of electron image targets, electron image focus means for simultaneously transferring all parts of said electron images by electron flow from said electron producing means to at least one of said targets in image focus, the threshold velocity of the electrons in said flow dependent upon the corresponding electron image area color representative characteristics, means for selectively reflecting the electrons of said electron flow whose velocity is below a predetermined amount, and means for converting each of the divided portions of the electron flow into electron images.

3. Apparatus for converting optical images into a plurality of independent signal trains, each signal train representative of a selected component color portion of said optical images comprising in combination, means for producing electron images of said optical images, a plurality of electron image targets, electron image focus means for simultaneously transferring all parts of said electron images by electron flow from said electron image producing means to at least one of said image targets in image focus, means for dividing said electron flow in accordance with the velocity of its electrons, means for converting each of the divided portions of the electron flow into selected component color representative signal trains, and means for balancing out that portion of the signal obtained from any one divided portion of said electron flow which is equal to the signal obtained from the next adjacent divided portion of the stream having the next greater velocity.

4. Apparatus for converting optical images into a plurality of independent signal trains, each signal train representative of a selected component color portion of said optical images comprising the combination of means for producing electron images of said optical images, a plurality of electron image targets, electron image focus means for simultaneously transferring said electron images in toto by electron flow from said electron image producing means to at least one of said targets in image focus, the threshold velocity of the electrons in said flow dependent upon the corresponding electron image area color representative characteristics, means for reflecting said electron flow in accordance with the velocity of its electrons, means for converting each of the divided portions of the electron flow into selected component color representative signal trains, and means for electrically balancing out that portion of the signal obtained from any one divided portion of said electron flow which is equal to the signal obtained from the next adjacent divided portion of the stream having the next greater velocity.

5. Apparatus for converting optical images into a plurality of independent signal trains, each signal train representative of a selected component color portion of said optical images comprising in combination, means for producing electron images of said optical images, means for simultaneously transferring the complete electron images by electron flow, the threshold velocity of the electrons in said flow dependent upon the corresponding electron image area color representative characteristics, an electronic mirror located at one position along said flow for selectively reflecting the electrons of said flow whose velocity is below a first predetermined amount, a second electronic mirror positioned at another position along said flow for selectively reflecting the electrons of said flow whose velocity is below a second predetermined amount, said second predetermined amount being greater than said first predetermined amount, means for converting each of the divided portions of the electron flow into selected component color representative signal trains, and means for electrically balancing out that portion of the signal obtained from any one divided portion of said electron flow which is equal to the signal obtained from the next adjacent divided portion of the stream having the next greater velocity.

6. An apparatus for dividing optical images into selected component color images comprising in combination means for producing electron images of said optical images, an electron image target, an electronic lens for simultaneously transferring all parts of said electron images by electron flow, and electronic mirror means for reflecting the electrons of said electron flow to said electron image target in image focus in accordance with their velocity.

7. An apparatus for dividing optical images into selected component color images comprising in combination a photo cathode for producing electron images of said optical images, an electron image target, an electronic lens for simultaneously transferring all parts of said electron images by electron flow, the threshold velocity of the electrons in said flow dependent upon the corresponding electron image area color representative characteristics, and electronic mirror means for selectively reflecting the electrons of said electron flow whose velocity is below a predetermined amount to said electron image target in image focus.

8. An apparatus for dividing optical images into selected component color images comprising in combination a photo cathode for producing electron images of said optical images, an electron image target, an electronic lens for simultaneously transferring all parts of said electron images by electron flow, the threshold velocity of the electrons in said flow dependent upon the corresponding electron image area color representative characteristics, and a combination of parallel electrodes having predetermined potentials applied thereto for selectively reflecting to said electron image target the electrons of said electron flow whose velocity is below a predetermined amount.

9. An apparatus for dividing optical images into selected component color images comprising in combination a photo cathode for producing electron images of said optical images, an electron image target, an electronic lens for simultaneously transferring all parts of said electron images by electron flow, the threshold velocity of the electrons in said flow dependent upon the corresponding electron image area color representative characteristics, and a combination of parallel screen electrodes for selectively reflecting the electrons of said electron flow whose velocity is below a predetermined amount of said electron image target.

10. An apparatus for dividing optical images into selected component color images comprising in combination a photo cathode for producing electron images of said optical images, a plurality of electron image target electrodes, an electronic lens for simultaneously transferring all parts of said electron images by electron flow, the threshold velocity of the electrons in said flow dependent upon the corresponding electron image area color representative characteristics, and a combination of parallel screen electrodes for selectively reflecting the electrons of said electron flow whose velocity is below a predetermined amount to intercept each of said electron image target electrodes.

11. An apparatus for dividing optical images into selected component color images comprising in combination a photo cathode for producing electron images of said optical images, an electronic lens for simultaneously transferring all parts of said electron images by electron flow, the threshold velocity of the electron in said flow dependent upon the corresponding electron image area color representative characteristics, and a combination of three parallel screen electrodes having a first potential applied to the outer two of said screen electrodes and having a second potential applied to the inner of said screen electrodes and selectively reflecting the electrons of said electron flow whose velocity is below a predetermined amount.

12. An apparatus for dividing optical images into selected component color images comprising in combination a photo cathode for producing electron images of said optical images, an electronic lens for simultaneously transferring all parts of said electron images by electron flow, the threshold velocity of the electrons in said flow dependent upon the corresponding electron image area color representative characteristics, and a combination of three parallel screen electrodes having a potential equal to the surrounding space applied to the outer two of said screen electrodes, said combination of electrodes having a potential slightly below the potential of said photo cathode applied to the inner of said screen electrodes, selectively reflecting the electrons of said electron flow whose velocity is below a predetermined amount.

13. An apparatus for dividing optical images into selected component color images comprising in combination a photo cathode for producing electron images of said optical images, a plurality of electron image target electrodes, an electronic lens for simultaneously transferring all parts of said electron images by electron flow, the threshold velocity of the electrons in said flow dependent upon the corresponding electron image area color representative characteristics, and a combination of a first set of three parallel screen electrodes positioned in said flow and having a first potential applied to the outer two of said screen electrodes and having a second potential applied to the inner of said screen electrodes, and a combination of a second set of three parallel screen electrodes positioned in said flow and having a third potential applied to the outer two of said screen electrodes of said second set and having a fourth potential applied to the inner screen electrode of said second set.

14. An electronic device consisting of an electron picture image detail emitting surface, an electronic lens system arranged to simultaneously transfer said image detail, an electronic mirror consisting of a screen having a potential substantially equal to the surrounding field, a flat electrode behind said screen in close proximity thereto and charged negatively with respect to the emitting surface, and one or more electron image targets in which the said electron mirror is tilted with respect to the emitting surface.

15. An electron device consisting of a complete electron image emitting surface, a plurality of electron image targets, an electron lens system positioned to maintain the detail of said image and to simultaneously transfer all parts of said electron image by electron flow, means for selectively reflecting only the electrons of said electron flow whose velocity is below a predetermined amount, and means for converting each of the divided portions of the electron flow into independent electron images on said image targets.

ALFRED C. SCHROEDER.
GEORGE C. SZIKLAI.

References Cited in the file of this patent

UNITED STATES PATENTS

| Number | Name | Date |
|---|---|---|
| 2,126,286 | Schlesinger | Aug. 9, 1938 |
| 2,156,915 | Knoll | May 2, 1939 |
| 2,163,787 | Henneberg et al. | June 27, 1939 |
| 2,243,102 | Klemperer | May 27, 1941 |
| 2,253,292 | Goldsmith | Aug. 19, 1941 |
| 2,294,820 | Wilson | Sept. 1, 1942 |
| 2,332,876 | Uhlmann | Oct. 26, 1943 |
| 2,335,180 | Goldsmith | Nov. 23, 1943 |
| 2,343,825 | Wilson | Mar. 7, 1944 |
| 2,422,778 | Finch | June 24, 1947 |
| 2,552,386 | Sziklai | May 8, 1951 |

FOREIGN PATENTS

| Number | Country | Date |
|---|---|---|
| 451,959 | Great Britain | Aug. 14, 1936 |
| 560,490 | Great Britain | Apr. 6, 1944 |